United States Patent
Kim

(10) Patent No.: US 11,259,170 B2
(45) Date of Patent: Feb. 22, 2022

(54) METHOD FOR REPORTING MOBILITY HISTORY OF TERMINAL AND APPARATUS FOR SUPPORTING SAME

(71) Applicant: LG Electronics Inc., Seoul (KR)

(72) Inventor: Sangwon Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/486,517

(22) PCT Filed: Feb. 22, 2018

(86) PCT No.: PCT/KR2018/002167
§ 371 (c)(1),
(2) Date: Aug. 16, 2019

(87) PCT Pub. No.: WO2018/155918
PCT Pub. Date: Aug. 30, 2018

(65) Prior Publication Data
US 2019/0373442 A1    Dec. 5, 2019

Related U.S. Application Data

(60) Provisional application No. 62/462,921, filed on Feb. 24, 2017.

(51) Int. Cl.
| | |
|---|---|
| *H04W 8/08* | (2009.01) |
| *H04W 76/27* | (2018.01) |
| *H04W 16/28* | (2009.01) |
| *H04W 24/10* | (2009.01) |
| *H04W 72/04* | (2009.01) |
| *H04W 88/02* | (2009.01) |

(52) U.S. Cl.
CPC ............ *H04W 8/08* (2013.01); *H04W 16/28* (2013.01); *H04W 24/10* (2013.01); *H04W 72/046* (2013.01); *H04W 76/27* (2018.02); *H04W 88/02* (2013.01)

(58) Field of Classification Search
None
See application file for complete search history.

(56) References Cited

U.S. PATENT DOCUMENTS

| | | | |
|---|---|---|---|
| 2013/0165120 A1* | 6/2013 | Nylander | H04W 36/0055 455/436 |
| 2013/0345965 A1 | 12/2013 | Kirmse et al. | |
| 2015/0208303 A1* | 7/2015 | Jung | H04J 11/00 455/436 |
| 2015/0230263 A1 | 8/2015 | Roy et al. | |
| 2016/0157147 A1 | 6/2016 | Saghir et al. | |
| 2017/0359106 A1* | 12/2017 | John Wilson | H04B 7/0408 |
| 2019/0335517 A1* | 10/2019 | Reial | H04W 36/0061 |

FOREIGN PATENT DOCUMENTS

| | | |
|---|---|---|
| KR | 100447411 | 9/2004 |
| WO | 2016115711 | 7/2016 |

* cited by examiner

*Primary Examiner* — Kouroush Mohebbi
(74) *Attorney, Agent, or Firm* — Dentons US LLP

(57) ABSTRACT

Disclosed are a method by which a terminal reports a mobility history, and an apparatus for supporting the same. The method comprises the steps of: updating, according to a movement of the terminal, a mobility history including identification information on a beam in which the terminal has stayed and a stay time in the beam; allowing the terminal to enter an RRC connection state; and transmitting the stored identification information and the stay time to a network.

5 Claims, 10 Drawing Sheets

METHOD FOR REPORTING MOBILITY HISTORY OF TERMINAL AND APPARATUS FOR SUPPORTING SAME

CROSS-REFERENCE TO RELATED APPLICATIONS

This application is the National Stage filing under 35 U.S.C. 371 of International Application No. PCT/KR2018/002167, filed on Feb. 22, 2018, which claims the benefit of U.S. Provisional Application No. 62/462,921 filed on Feb. 24, 2017, the contents of which are all hereby incorporated by reference herein in their entirety.

BACKGROUND OF THE INVENTION

Field of the Invention

The disclosure relates to a method for reporting the mobility history of a terminal in NR.

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to achieve a high data rate, it is considered to implement a super high frequency (millimeter wave (mm-Wave)) band, e.g., 60 GHz band, in the 5G communication system. To decrease a propagation loss of a radio wave and increase a transmission distance in the super high frequency band, beamforming, massive multiple-input multiple-output (MIMO), Full Dimensional MIMO (FD-MIMO), array antenna, analog beamforming, and large scale antenna techniques are discussed in the 5G communication system.

SUMMARY OF THE INVENTION

For a network to estimate the mobility of a user equipment (UE), a detailed data set about the moving path of the UE is required.

According to one embodiment of the disclosure, there is provided a method in which a UE reports a mobility history in a wireless communication system, the method including: updating a mobility history including identification information about a beam in which the UE stays and a stay time in the beam when the UE moves; allowing the UE to enter an RRC connected state; and transmitting the stored identification information and stay time to a network.

The mobility history may be updated whenever the beam in which the UE stays is changed.

The mobility history may be updated whenever a transmission reception point (TRP) in which the UE stays is changed.

The identification information about the beam may be a specific reference signal (RS) identity (ID) of the beam.

The mobility history may include identification information about a TRS in which the UE stays and a stay time in the TRP.

The identification information about the TRP may be a specific RS ID of the TRP.

The mobility history may include identification information about a cell in which the UE stays and a stay time in the cell.

The identification information about the cell may be a global ID of the cell.

The method may further include: determining whether the identification information about the beam is valid; and recording a cell ID of a cell in which the UE stays and a stay time in the cell in the mobility history when it is determined that the identification information about the beam is invalid.

According to another embodiment of the disclosure, there is provided a UE for reporting a mobility history in a wireless communication system, the UE including: a memory; a transceiver; and a processor to connect the memory and the transceiver, wherein the processor is configured to: update a mobility history including identification information about a beam in which the UE stays and a stay time in the beam when the UE moves; allow the UE to enter an RRC connected state; and transmit the stored identification information and stay time to a network.

The mobility history may be updated whenever the beam in which the UE stays is changed.

The mobility history may be updated whenever a TRP in which the UE stays is changed.

The identification information about the beam may be a specific RS ID of the beam.

The mobility history may include identification information about a TRS in which the UE stays and a stay time in the TRP.

The identification information about the TRP may be a specific RS ID of the TRP.

According to one embodiment of the disclosure, a UE may report the stay time of a UE to a network per beam or TRP, thus enabling the network to accurately estimate the mobility of the UE.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A and 5G. However, technical features of the disclosure are not limited thereto.

Figure 1:
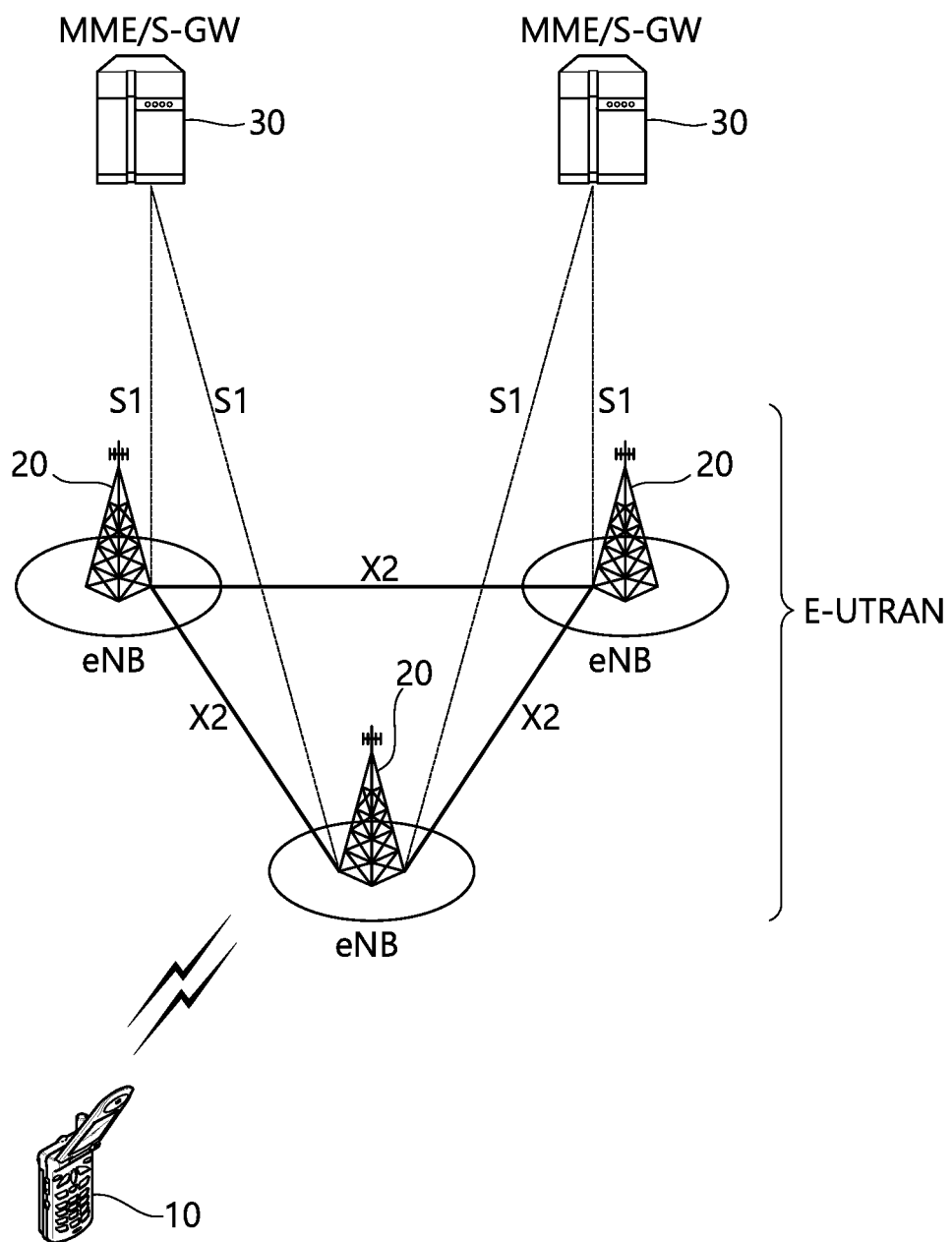
FIG. 1 shows the architecture of an LTE system.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
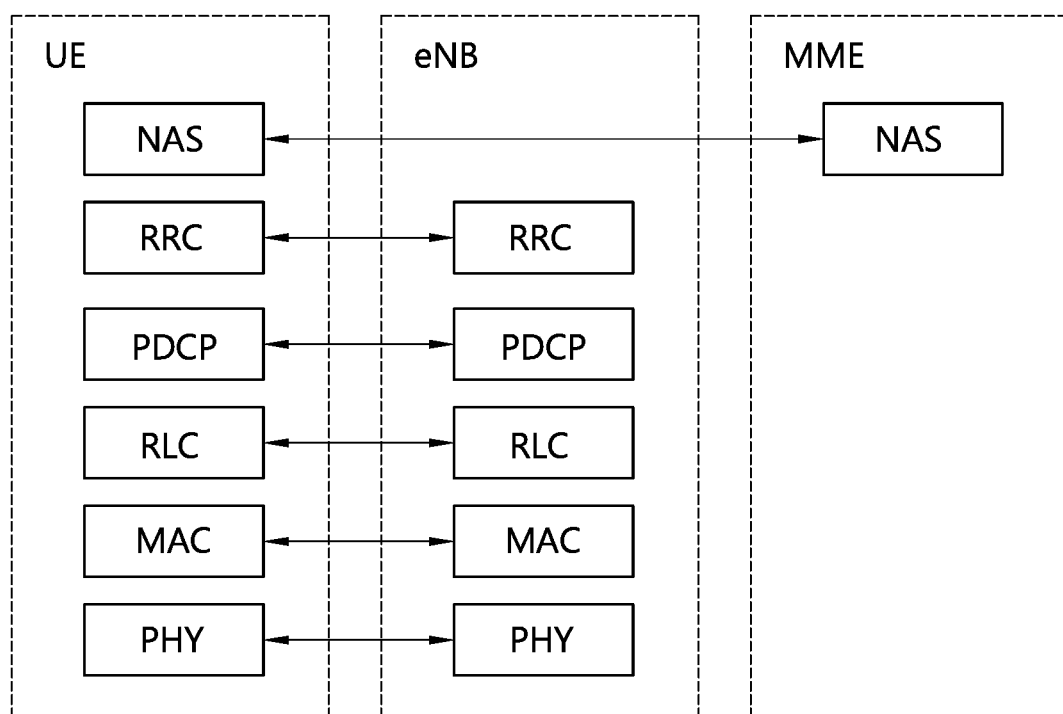
FIG. 2 shows a control plane of a radio interface protocol of an LTE system.
Figure 3:
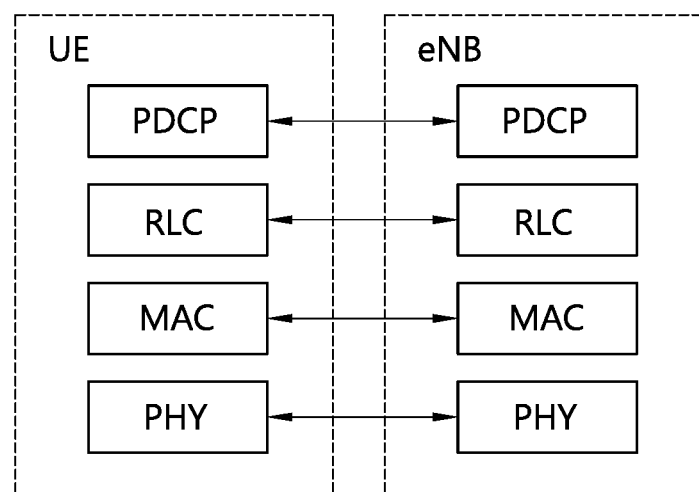
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Hereinafter, a 5G network structure is described.

Figure 4:
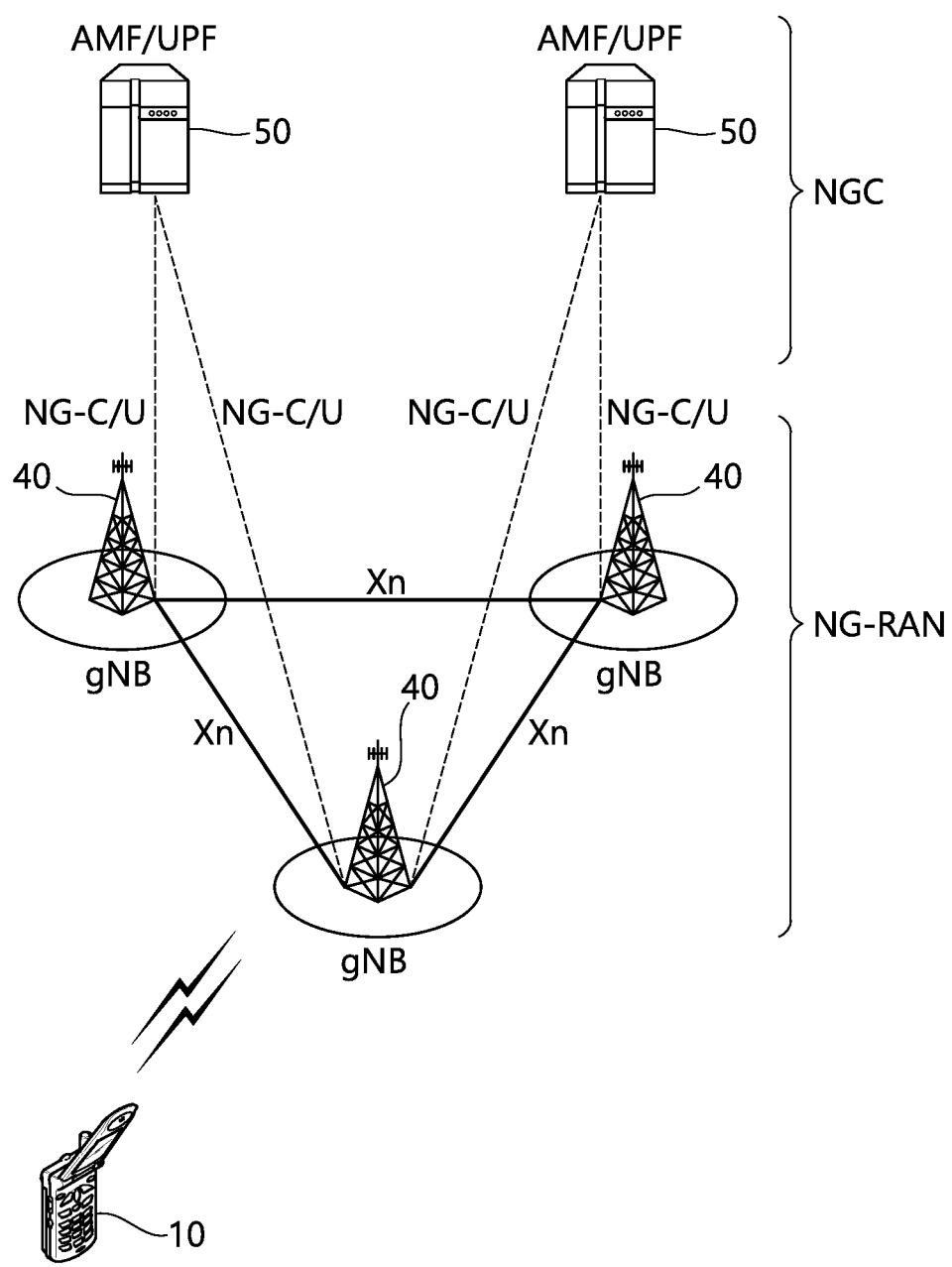
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE will be described.

In a discussion on the standardization of new radio (NR), an RRC_INACTIVE (RRC inactive) state is newly introduced in addition to an existing RRC_CONNECTED state and an existing RRC_IDLE state. The RRC_INACTIVE state is a state introduced to efficiently manage particular UE (e.g., mMTC UE). The RRC_INACTIVE state may also be referred to as a lightly connected (LC) state or a lightweight connection state. A UE in the RRC_INACTIVE state performs a radio control procedure similar to that of a UE in the RRC_IDLE state in order to reduce power consumption. However, the UE in the RRC_INACTIVE state maintains the state of connection between the UE and a network similar to the RRC_CONNECTED state in order to minimize a control procedure necessary for the transition to the RRC_CONNECTED state. In the RRC_INACTIVE state, a radio access resource is released, whereas a wired connection may be maintained. For example, in the RRC_INACTIVE state, a radio access resource is released, whereas an NG interface between a gNB and an NGC or an S1 interface between an eNB and an EPC may be maintained. In the RRC_INACTIVE state, a core network recognizes that the UE is normally connected to a BS. However, the BS may not perform connection management for the UE in the RRC_INACTIVE state. The RRC_INACTIVE state and the lightweight connection state may be considered to be substantially the same.

Meanwhile, in the E-UTRAN, the UE in the RRC_CONNECTED state does not support the UE-based cell reselection procedure. However, the UE in the RRC_INACTIVE state can perform the cell reselection procedure, and in this case, the UE should inform the E-UTRAN of the location information of the UE.

Hereinafter, a method and procedure in which a UE selects a cell will be described.

A cell selection process is divided into two categories.

First, in an initial cell selection process, the UE does not have previous information about a radio channel. Therefore, in order to search for a suitable cell, the UE searches for all radio channels. The UE searches for a strongest cell in each channel. Thereafter, when the UE finds a suitable cell satisfying a cell selection criterion, the UE selects the corresponding cell.

Next, the UE may select a cell using stored information or using information broadcasting in the cell. Therefore, the UE may quickly select a cell, compared with the initial cell selection process. When the UE finds a cell satisfying a cell selection criterion, the UE selects the corresponding cell. When the UE does not find a suitable cell satisfying the cell selection criterion through this process, the UE performs an initial cell selection process.

After selecting any cell through the cell selection procedure, intensity or a quality of signals between the UE and the BS may be changed due to a change in mobility or a radio environment of the UE. Therefore, when a quality of the selected cell is deteriorated, the UE may select another cell providing a better quality. When the cell is again selected in this way, the UE selects a cell generally providing a better signal quality than that of the currently selected cell. This process is referred to as cell reselection. The cell reselection process has a basic object in selecting a cell providing a best quality to the UE in a quality aspect of a radio signal.

In addition to a quality aspect of a radio signal, the network may determine a priority for each frequency to notify the UE of the priority. The UE, having received such a priority considers the priority more preferentially than radio signal quality criteria in a cell reselection process.

As described above, there is a method of selecting or reselecting a cell according to signal characteristics of a radio environment, and in selecting a cell for reselection, there may be the following cell reselection methods according to RAT and frequency characteristic of the cell.

Intra-frequency cell reselection: the UE reselects a cell having the same RAT as that of a camping cell and the same center-frequency as that of a camping cell Inter-frequency cell reselection: the UE reselects a cell having the same RAT as that of a camping cell and a center-frequency different from that of a camping cell Inter-RAT cell reselection: the UE reselects a cell using RAT different from camping RAT A principle of a cell reselection process is as follows:

First, the UE measures a quality of a serving cell and a neighboring cell for cell reselection.

Second, cell reselection is performed based on cell reselection criteria. Cell reselection criteria have the following characteristics with respect to measurement of the serving cell and the neighboring cell.

Intra-frequency cell reselection is basically performed based on a ranking. The ranking is a work that defines an index value for cell reselection evaluation and that sequences cells in magnitude order of the index value using the index value. A cell having a best index is often referred to as a highest ranked cell. A cell index value is a value that applies a frequency offset or a cell offset, as needed based on a value in which a UE measures for the corresponding cell.

Inter-frequency cell reselection is performed based on a frequency priority provided by the network. The UE attempts to camp on in a frequency having a highest frequency priority. The network may provide a frequency priority to be commonly applied to UEs within a cell through broadcast signaling or may provide a priority for each frequency for each UE through dedicated signaling for each UE. A cell reselection priority provided through broadcast signaling may be referred to as a common priority, and a cell reselection priority set by a network for each UE may be referred to as a dedicated priority. When receiving the dedicated priority, the UE may together receive a validity time related to the dedicated priority. When receiving the dedicated priority, the UE starts a validity timer set to the together received validity time. While the validity timer operates, the UE applies a dedicated priority in an RRC idle mode. When the validity timer has expired, the UE discards a dedicated priority and again applies a common priority.

For inter-frequency cell reselection, the network may provide a parameter (e.g., frequency-specific offset) used for cell reselection for each frequency to the UE.

For intra-frequency cell reselection or inter-frequency cell reselection, the network may provide a neighboring cell list (NCL) to be used for cell reselection to the UE. The NCL includes a cell-specific parameter (e.g., cell-specific offset) to be used for cell reselection.

For intra-frequency or inter-frequency cell reselection, the network may provide a cell reselection black list to be used for cell reselection to the UE. For a cell included in the black list, the UE does not perform cell reselection.

The parameters used for cell reselection may be scaled according to the mobility of the UE. The mobility of the UE may be estimated on the basis of the number of times the UE is moved by cell reselection and/or a handover in a specified period of time, which is referred to as mobility state estimation (MSE). The mobility of the UE may be estimated as one of a normal mobility state, a medium mobility state, and a high mobility state according to MSE.

Hereinafter, beamforming will be described.

Beamforming technology using multiple antennas may be broadly divided into analog beamforming technology (hereinafter, "analog beamforming") and digital beamforming technology (hereinafter, "digital beamforming") depending on where a beamforming weight vector or precoding vector is applied.

Figure 5:
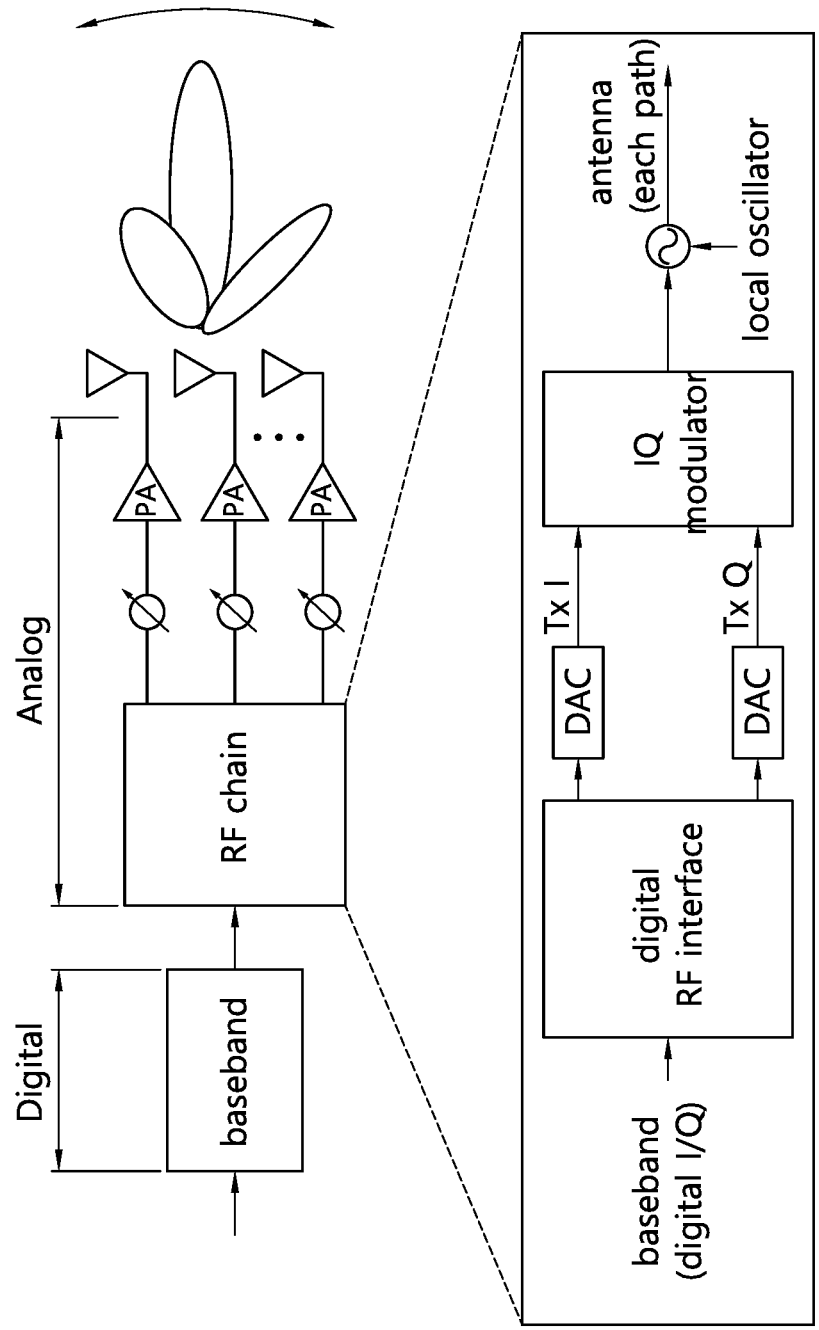
FIG. 5 shows an example of analog beamforming.

FIG. 5 shows an example of analog beamforming.

Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 5, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 6:
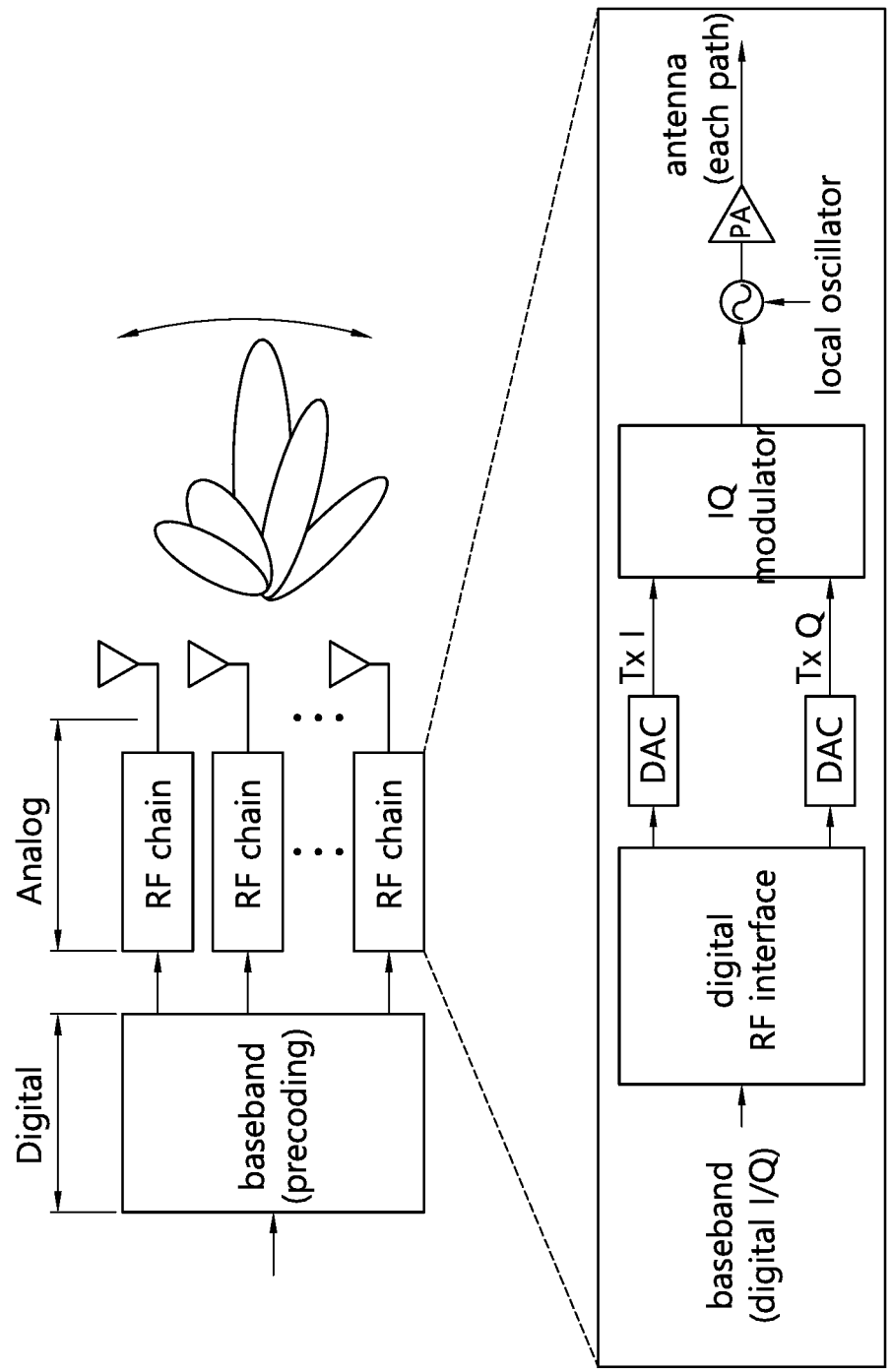
FIG. 6 shows an example of digital beamforming.

FIG. 6 shows an example of digital beamforming.

In digital beamforming, as opposed to analog beamforming, a beam is formed in the digital stage by a baseband process, in order to maximize diversity and multiplexing gain in an MIMO environment. Referring to FIG. 6, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Figure 7:
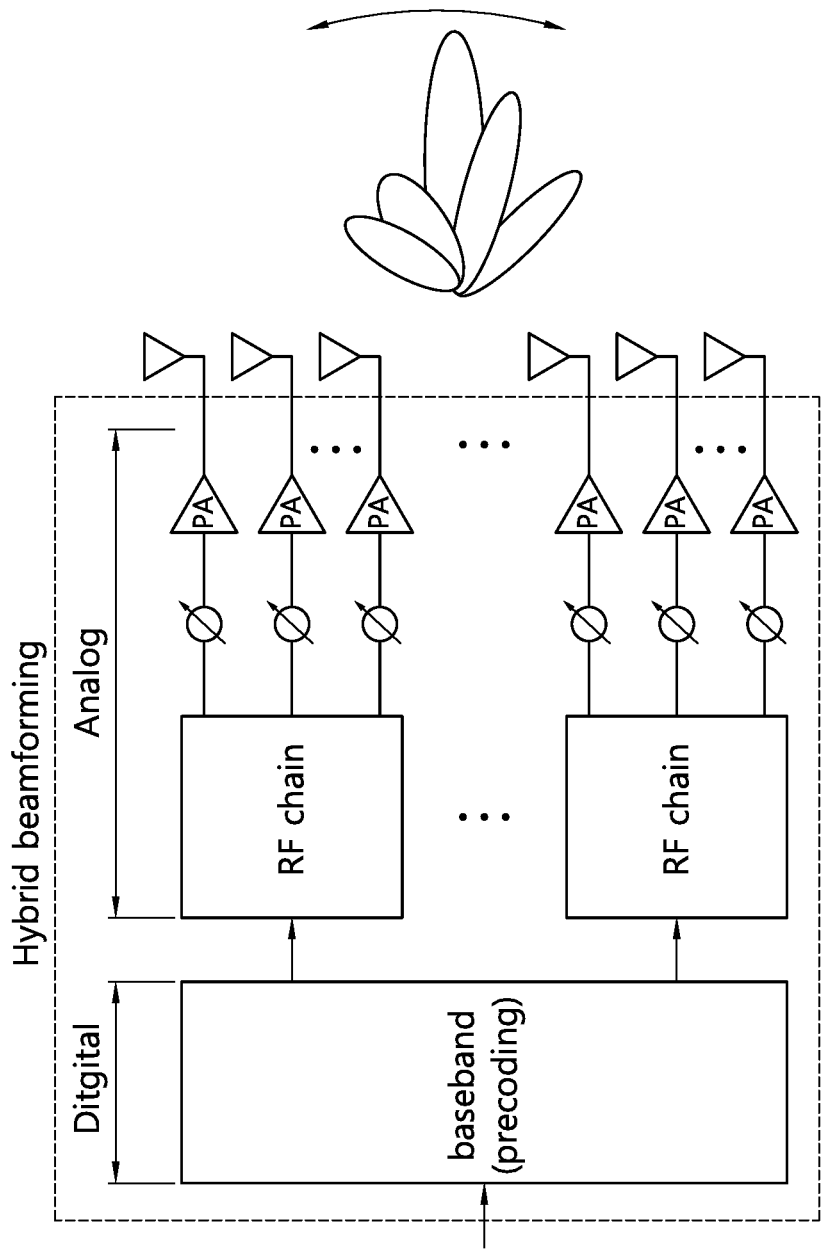
FIG. 7 shows an example of hybrid beamforming.

FIG. 7 shows an example of hybrid beamforming.

As described above, hybrid beamforming is aimed at configuring a transmitting end capable of taking advantage of the advantages of analog beamforming and digital beamforming in a large MIMO environment. Referring to FIG. 7, hybrid beamforming basically forms a coarse beam through analog beamforming and forms a beam for multiple streams or multi-user transmission through digital beamforming. That is, the hybrid beamforming may have a structure for simultaneously taking the analog beamforming and the digital beamforming in order to lower the implementation complexity or the hardware complexity of the transmitting end.

In order to achieve a high data rate, the Millimeter Wave (mmW) band is being considered in the new RAT. Since the microwave band has a short wavelength, a plurality of antennas can be installed in the same area. For example, since the wavelength is 1 cm in the 30 GHz band, a total of 100 antenna elements can be installed at 0.5-lambda intervals and as a 2-dimension array on a panel having a breath of 5 cm and a length of 5 cm. If multiple antenna elements are used in the very high frequency band, the coverage can be increased and the throughput can be improved by the increase of the beamforming gain.

A UE may report mobility history information about the time for which the UE stayed in a previous serving cell to a network so that the network can estimate the speed of the UE. According to a related art, a UE is configured to report the location and stay time of the UE in each cell to a network whenever a serving cell is changed. That is, when the UE can store mobility history information, the UE may perform the following process.

1> When a cell including a PCell in RRC_CONNECTED or a serving cell in RRC_IDLE is changed to another E-UTRAN or inter-RAT cell or when the UE enters an out-of-service state, 2> the UE may create a new entry in a VarMobilityHistoryReport parameter after deleting the oldest entry and, if necessary, performs the following process:

3> if the global cell ID of a previous PCell or serving cell is valid,

4> the UE includes the global cell ID of the cell in a visitedCellId field of the entry;

3> otherwise,

4> the UE includes the physical cell ID and carrier frequency of the cell in the visitedCellId field of the entry;

3> the UE sets a timeSpentTRP field of the entry to the time of stay in a previous TRP.

In this description, VarMobilityHistoryReport may include a mobility history. Further, VisitedCellInfoList may include a mobility history about the time for which the UE stayed in a last visited cell or outside E-UTRA. According to one embodiment, this mobility history information may store up to 16 history lists. A last visited cell may be stored as a first list. The list may include a cell which the UE visited in the RRC idle state and the RRC connected state.

However, since the coverage of a cell is extensive and the size of coverage is different depending on each cell, when the location of a UE is reported on the basis of each cell, there is a limit in accurately estimating the location of the UE. Therefore, in a multi-beam environment, a UE is required to report more detailed information to improve accuracy in estimating the speed of the UE.

Hereinafter, a mobility history report method of a UE according to an embodiment of the disclosure will be described.

According to an embodiment of the disclosure, when a UE can store mobility history information, the UE can perform the following process.

1> When a serving beam is changed to another beam or when the UE enters the out-of-service state, 2> the UE may create a new entry in a VarMobilityHistoryReport parameter after deleting the oldest entry and, if necessary, performs the following process:

3> if the beam ID or a beam-specific RS ID of a previous beam is valid,

4> the UE includes the beam ID or the beam-specific RS (e.g., CSI-RS) ID of the beam in a visitedBeamPId field of the entry;

3> if the TRP ID of a transmission reception point (TRP) to which the previous beam belongs or a TRP-specific RS ID thereof is valid, 4> the UE includes The TRP ID or the TRP-specific RS ID of the beam in a visited TRPId field of the entry;

3> if the global cell ID of a previous PCell or previous serving cell to which the previous beam belongs is valid, 4> the UE includes the global cell ID of the cell in a visitedCellId field of the entry;

3> otherwise,
4> the UE includes the physical cell ID and carrier frequency of the cell in the visitedCellId field of the entry;
3> the UE sets a TimeSpentBeam field of the entry to the time of stay in the previous beam.
1> When a serving TRP is changed to another TRP or when the UE enters the out-of-service state,
2> the UE may create a new entry in a VarMobilityHistoryReport parameter after deleting the oldest entry and, if necessary, performs the following process:
3> if the TRP ID or TRP-specific RS ID of a previous TRP is valid,
4> the UE includes the TRP ID or the TRP-specific RS ID of the TRP in a visited TRPId field of the entry;
3> if the global cell ID of a previous PCell or previous serving cell to which the previous TRP belongs is valid,
4> the UE includes the global cell ID of the cell in a visitedCellId field of the entry;
3> otherwise,
4> the UE includes the physical cell ID and carrier frequency of the cell in the visitedCellId field of the entry;
3> the UE sets a TimeSpentTRP field of the entry to the time of stay in the previous TRP.

In this description, a TRP is an area formed by a data transmission point and a data reception point and may include a plurality of beam areas. Further, a cell may include a plurality of TRPs.

Whenever a UE enters an RRC state in which uplink transmission is supported (i.e., an RRC connection-activated state or an RRC connection-deactivated state) from an RRC state in which uplink transmission is not supported (i.e., the RRC idle state), the UE may report a mobility history stored thereby to a network. When the network requests the UE to report a mobility history, the UE may transmit the stored mobility history to the network in response to this request.

Figure 8:
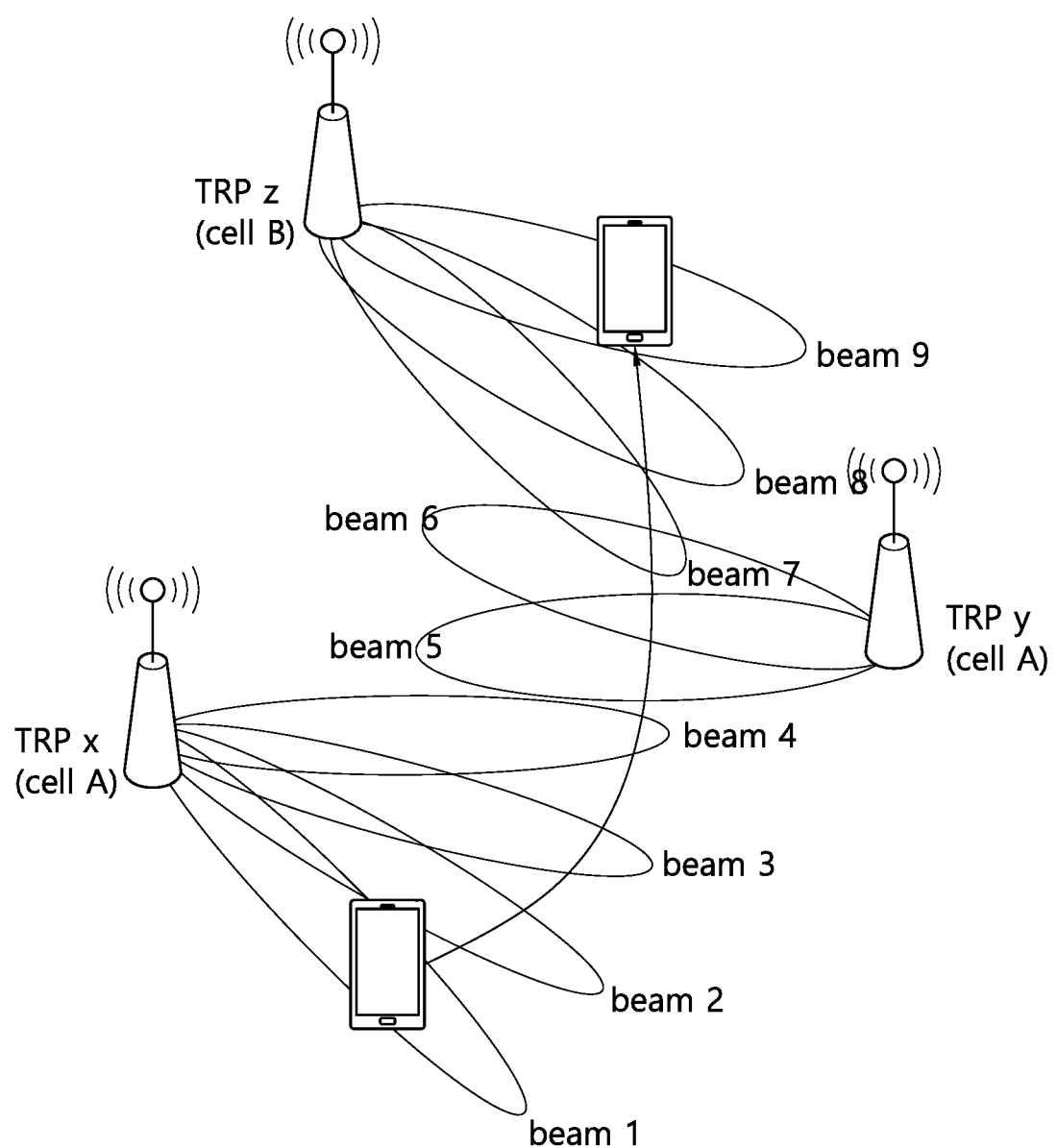
FIG. 8 illustrates a mobility history report method of a UE according to an embodiment of the disclosure.

FIG. 8 illustrates a mobility history report method according to an embodiment of the disclosure. Referring to FIG. 8, a UE in the RRC idle state may move from beam 1 of cell A to beam 9 of cell B. As described above, a plurality of TRPs and a plurality of beams may be included in one cell.

The UE may store a mobility history about the time for which the UE stays in a changed beam and the time for which the UE stays in a previous beam whenever a serving beam is changed. Table 1 shows the mobility history stored in the UE. Referring to Table 1, when a serving beam is changed from beam 1 to beam 2, the UE may store the time for which the UE stays in beam 1 in a first entry of the mobility history. Also, when the serving beam is changed from beam 2 to beam 3, the UE may store the time for which the UE stays in beam 2 in a second entry of the mobility history.

TABLE 1

| Entry | Visited cell ID | Cell stay time | Visited TRP ID | TRP stay time | Visited beam ID | Beam stay time |
|---|---|---|---|---|---|---|
| #1 | A | | X | | 1 | 10 |
| #2 | A | | X | | 2 | 12 |
| #3 | A | | X | | 3 | 14 |
| #4 | A | | X | 52 | 4 | 16 |
| #5 | A | | Y | | 5 | 18 |
| #6 | A | 82 | Y | 30 | 6 | 12 |
| #7 | B | | Z | | 7 | 10 |
| #8 | B | | Z | | 8 | 8 |
| #9 | B | | z | | 9 | 4 |

As illustrated in Table 1, when the moving path of the UE is stored per TRP or beam, it is possible to detect the moving path and location of the UE in more detail.

According to one embodiment, when the beam is changed, if the beam ID or beam-specific RS ID of the previous beam is valid, the UE may store the beam ID or the beam-specific RS ID in a visitedBeamId field of the mobility history. For example, the UE can recognize a beam through the RS ID of the beam within a particular beam area. That is, the UE may record the mobility history of the UE per beam whenever the serving beam is changed. Referring to Table 1, when the UE moves from beam 3 to beam 4, the UE may store 3, which is the ID of beam 3. Further, when the UE moves from beam 4 to beam 5, the UE may store 4, which is the ID of beam 4. Further, when the UE moves from beam 5 to beam 6, the UE may store 5, which is the ID of beam 5.

Further, when the beam is changed, if the TRP ID or TRP-specific RF ID of the previous beam is valid, the UE may store the TRP ID or TRP-specific RS ID in a visitedTRPId field of the mobility history. For example, a TRP is an area formed by a data transmission point and a data reception point and may include a plurality of beam areas, and a plurality of TRPs may be included in one cell. That is, the UE may record the mobility history of the UE per TRP whenever the serving beam is changed. Referring to Table 1, when the UE moves from beam 3 to beam 4, the UE may store X, which is the TRP ID of a TRP to which beam 3 belongs. Further, when the UE moves from beam 4 to beam 5, the UE may store X, which is the TRP ID of a TRP to which beam 4 belongs. Further, when the UE moves from beam 5 to beam 6, the UE may store Y, which is the TRP ID of a TRP to which beam 5 belongs.

In addition, when the beam is changed, if the global cell ID of a previous PCell or previous serving cell to which the previous beam belongs is valid, the UE may store the global cell ID in a visitedCellId field of the mobility history. That is, the UE may record the mobility history of the UE per cell whenever the serving beam is changed. Referring to Table 1, when the UE moves from beam 3 to beam 4, the UE may store A, which is the cell ID of a cell to which beam 3 belongs. Further, when the UE moves from beam 4 to beam 5, the UE may store A, which is the cell ID of a cell to which beam 4 belongs. Further, when the UE moves from beam 7 to beam 8, the UE may store B, which is the cell ID of a cell to which beam 7 belongs.

When the serving beam of the UE is changed but the beam ID (or beam-specific RS ID) of the previous beam, the TRP ID (or TRP-specific RS ID) of the previous beam, or the global ID of the previous PCell (or serving cell) to which the previous beam belongs is not valid, the UE may store the physical cell ID and carrier frequency of the previous cell in the visitedCellId field of the mobility history.

According to another embodiment, when the TRP is changed, if the TRP ID or TRP-specific RS ID of the previous TRP is valid, the UE may store the TRP ID or the TRP-specific RS ID in a visited TRPId field of the mobility history. That is, the UE may record the mobility history of the UE per TRP whenever the serving TRP is changed.

In addition, when the TRP is changed, if the global cell ID of a previous PCell or previous serving cell to which the previous TRP belongs is valid, the UE may store the global cell ID in a visitedCellId field of the mobility history. That is, the UE may record the mobility history of the UE per cell whenever the serving TRP is changed.

When the serving TRP of the UE is changed but the TRP ID (or TRP-specific RS ID) of the previous TRP or the global ID of the previous PCell (or serving cell) to which the previous TRP belongs is not valid, the UE may store the physical cell ID and carrier frequency of the previous cell in the visitedCellId field of the mobility history.

When the UE enters the RRC connected state from the RRC idle state, the UE may transmit the stored mobility history to a network. For example, the UE may enter the RRC connected state in beam 9 of cell B. Here, the UE may transmit the mobility history stored therein to cell B.

Upon receiving a request to transmit the mobility history from the network, the UE may transmit the stored mobility history to the network.

Meanwhile, when the UE enters an out-of-service state, the UE may store the mobility history. Specifically, when the UE becomes out-of-service in beam 4 of cell A, the UE may store the time for which the UE stays in-service in beam 4 in the mobility history.

Figure 9:
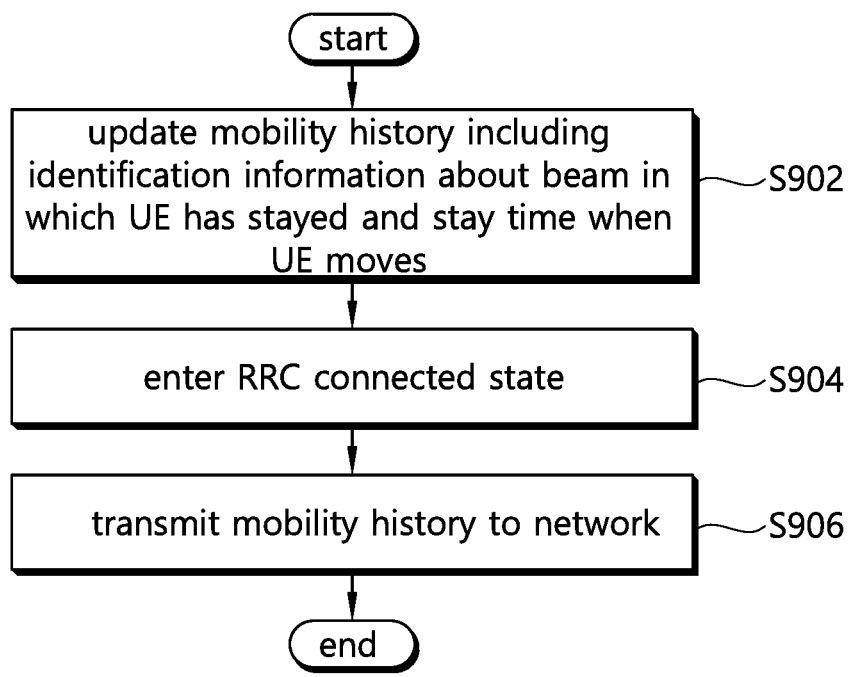
FIG. 9 is a flowchart illustrating a mobility history report method of a UE according to an embodiment of the disclosure.
Figure 10:
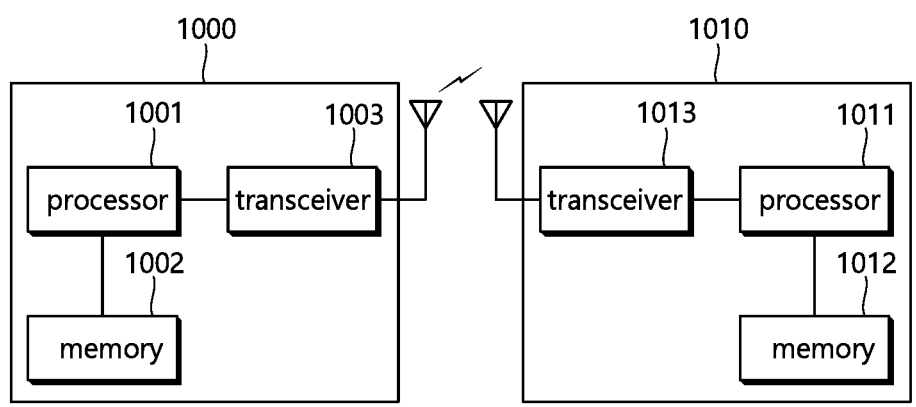
FIG. 10 is a block diagram illustrating a wireless communication system according to an embodiment of the disclosure.

FIG. 9 is a flowchart illustrating a mobility history report method according to an embodiment of the disclosure.

In step S902, when a UE moves, the UE may update a mobility history including identification information about a beam in which the UE has stayed and a stay time in the beam. The UE may update the mobility history whenever the beam in which the UE stays is changed. In addition, the UE may update the mobility history whenever a TRP in which the UE stays is changed. The identification information about the beam may be a specific RS ID of the beam. The mobility history may include identification information about a TRS in which the UE stays and a stay time in the TRP. The identification information about the TRP may be a specific RS ID of the TRP. The mobility history may include identification information about a cell in which the UE stays and a stay time in the cell. The identification information about the cell may be a global ID of the cell.

In step S904, the UE may enter the RRC connected state.

In step S906, the UE may transmit the stored identification information and stay time to a network.

In addition, the UE may determine whether the identification information about the beam is valid. When it is determined that the identification information about the beam is invalid, the UE may record a cell ID of a cell in which the UE stays and a stay time in the cell in the mobility history.

A BS 1000 includes a processor 1001, a memory 1002, and a radio frequency (RF) unit 1003. The memory 1002 is coupled to the processor 1001, and stores a variety of information for driving the processor 1001. The RF unit 1003 is coupled to the processor 1001, and transmits and/or receives a radio signal. The processor 1001 implements the proposed functions, procedures, and/or methods. In the aforementioned embodiments, an operation of the BS may be implemented by the processor 1001.

A UE 1010 includes a processor 1011, a memory 1012, and an RF unit 1013. The memory 1012 is coupled to the processor 1011, and stores a variety of information for driving the processor 1011. The RF unit 1013 is coupled to the processor 1011, and transmits and/or receives a radio signal. The processor 61 implements the proposed functions, procedures, and/or methods. In the aforementioned embodiments, an operation of the UE 1010 may be implemented by the processor 1011.

The processors 1011 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method in which a user equipment (UE) reports a mobility history in a wireless communication system, the method comprising:
   storing a valid reference signal (RS) identity (ID) related to a beam in a field related to a beam ID and a stay time, during which the UE stays in the beam, in a mobility history based on a change of the beam;
   storing, a valid RS ID related to a transmission reception point (TRP) during which the UE stays in a field related to a TRP ID and a stay time in the TRP, in the mobility history based on a change of the TRP;
   allowing the UE to enter an RRC connected state; and
   transmitting the mobility history to a network,
   wherein the TRP is an area formed by a data transmission point and a data reception point, and
   wherein the TRP includes a plurality of beam areas.

2. The method of claim 1, wherein the mobility history comprises identification information about a cell in which the UE stays and a stay time in the cell.

3. The method of claim 2, wherein the identification information about the cell is a global ID of the cell.

4. The method of claim 1, further comprising:
   recording a cell ID of a cell in which the UE stays and a stay time in the cell in the mobility history based on invalidity of the beam.

5. A user equipment (UE) for reporting a mobility history in a wireless communication system, the UE comprising:
   a memory;
   a transceiver; and
   a processor operatively connected to the memory and the transceiver, wherein the processor is configured to:
   store a valid reference signal (RS) identity (ID) related to a beam in a field related to a beam ID and a stay time, during which the UE stays in the beam, in a mobility history based on a change of the beam;
store, a valid RS ID related to a transmission reception point (TRP) during which the UE stays in a field related to a TRP ID and a stay time in the TRP, in the mobility history based on a change of the TRP;
allow the UE to enter an RRC connected state; and
transmit the mobility history to a network,
wherein the TRP is an area formed by a data transmission point and a data reception point, and
wherein the TRP includes a plurality of beam areas.

* * * * *